United States Patent [19]

Wirsig et al.

[11] Patent Number: 5,038,550
[45] Date of Patent: Aug. 13, 1991

[54] VERTICAL FORM AND FILL MACHINE IMPROVEMENTS

[75] Inventors: Ralph C. Wirsig, Kingston; Arnold E. Perrett, Whitby, both of Canada

[73] Assignee: Du Pont Canada, Inc., Mississauga, Canada

[21] Appl. No.: 471,602

[22] Filed: Jan. 29, 1990

[30] Foreign Application Priority Data

Feb. 2, 1989 [GB] United Kingdom ............... 8902320

[51] Int. Cl.$^5$ .......................... B65B 9/12; B65B 9/14
[52] U.S. Cl. ...................................... 53/451; 53/551; 53/552
[58] Field of Search ................. 53/551, 552, 554, 451, 53/526, 527, 373, 386, 255, 260, 530, 173

[56] References Cited

U.S. PATENT DOCUMENTS

| | | | |
|---|---|---|---|
| 2,182,187 | 12/1939 | Wagner | 53/173 X |
| 3,464,181 | 9/1969 | Hechenleitner | 53/551 X |
| 3,538,676 | 11/1970 | Runo et al. | 53/552 |
| 4,215,520 | 8/1980 | Heinzer et al. | 53/173 |
| 4,320,615 | 3/1982 | Gmür | 53/386 X |
| 4,353,196 | 10/1982 | Beer et al. | 53/552 X |
| 4,355,493 | 10/1982 | Ellert | 53/530 X |
| 4,534,159 | 8/1985 | Kelly | 53/552 |
| 4,640,083 | 2/1987 | Takahashi et al. | 53/551 |
| 4,697,403 | 10/1987 | Simpson et al. | 53/551 |
| 4,718,217 | 1/1988 | Ross | 53/552 X |
| 4,757,668 | 7/1988 | Klinkel et al. | 53/551 X |
| 4,768,330 | 9/1988 | Lane et al. | 53/554 |
| 4,829,745 | 5/1989 | Behr et al. | 53/451 |
| 4,869,048 | 9/1989 | Boeckmann | 53/451 |

Primary Examiner—Horace M. Culver

[57] ABSTRACT

A vertical form, fill and seal machine has a pair of transverse heat sealing jaws adapted to collapse a tubular film, a pair of spreader fingers, and at least one pair of detucker fingers to pinch a longitudinal edge of the tubular film and urge the pinched tubular film away from the other longitudinal edge of the film.

38 Claims, 8 Drawing Sheets

VERTICAL FORM AND FILL MACHINE IMPROVEMENTS

The invention relates to a devices for better uniformity in the strength of the transverse seal in pouches filled with flowable materials, e.g. liquids, made using a so-called vertical form, fill and seal machine.

It is well known to package flowable materials, for example, milk, syrups, sauces, on so-called vertical form, fill and seal machines. Using such a machine, a flat web of synthetic thermoplastic film is unwound from a roll and formed into a continuous tube in a tube forming section, by sealing the longitudinal edges of the film together to form a so-called lap seal or a so-called fin seal. The tube thus formed is pulled vertically downwards to a filling station. The tube is then collapsed across a transverse cross-section of the tube, the position of the cross-section being at a sealing device below the filling station. A transverse heat seal is made, by the sealing device, at the collapsed portion of the tube, thus making an airtight seal across the tube. The sealing device generally comprises a pair of jaws. After making the transverse seal, but before the jaws of the sealing device are opened, a quantity of material to be packaged, e.g. liquid, is caused to enter the tube, at the filling station, and fill the tube upwardly from the aforementioned transverse seal. The tube is then caused to move downwardly a predetermined distance. Such movement may be under the influence of the weight of the material in the tube, or may be caused by pulling or mechanically driving the tube. The jaws of the sealing device are closed again, thus collapsing the tube at a second transverse section. The second transverse section may be above, usually just above, the air/material interface in the tube, or the second transverse section may be below the air/material interface. The sealing device seals and severs the tube transversely at the second transverse section. The material-filled portion of the tube is now in the form of a pillow shaped pouch. Thus the sealing device has sealed the top of the filled pouch, sealed the bottom of the next-to-be formed pouch, all in one operation. One such vertical form, fill and seal machine of the type described above is sold under the trade mark PREPAC. With some other machines, the sealing device does not sever the tube at the second transverse section, but does sever the tube subsequently. In order to package certain flowable but viscous materials, it is often desirable to heat the material. When such is the case the packaging process is often referred to as a hot-fill process.

It has been noticed that in certain situations many pouches formed on vertical form, fill and seal machines have tucks in the horizontal seal, causing weakening of the horizontal seal. It has also been noticed that in certain situations hydraulic forces engendered during the sealing process cause weakening of the horizontal seal. Various aspects of the present invention seek to overcome the difficulties caused by tucks and/or such hydraulic forces.

To exemplify such difficulties, as indicated above, in order to provide the necessary fluidity for packaging some flowable materials, e.g. syrups and sauces, such materials must be heated. The hot material tends to make the tubular film limper, i.e. less rigid and more difficult to handle in the packaging process. In particular the film tends to pucker and fold, i.e. form tucks, at the transverse seal, which may lead to weak heat seals.

An apparatus and method for overcoming some of these difficulties is disclosed in U.S. Pat. No. 4,534,159 which issued 1985 Aug. 13 to R. C. Kelly. The present invention is intended to help alleviate these difficulties in a different manner.

Further, as indicated above, it has been found that when pouches are being completely filled, i.e. without any "headspace", it is necessary to seal the tubular film, horizontally, below the material/air interface. The clamping pressure of the jaws and speed of closure of the jaws develop considerable hydraulic pressure in the filled pouch, such hydraulic pressure being sufficient to weaken the horizontal seal, particularly in small pouches and in hot-fill processes. The present invention also seeks to alleviate this and other difficulties.

The present invention provides, on a vertical form, fill and seal machine which has a pair of transverse heat sealing jaws with at least one of said jaws being capable of transverse motion and adapted to collapsed a tubular film, horizontally, passing between said jaws, an improvement wherein there is a constraint chute below said jaws, said constraint chute comprising two vertical walls which are adapted to permit a material-filled pouch to travel therebetween, said pouch being formed by transversely heat sealing a material-filled tubular film at intervals, using said jaws to form said seals, one of said walls being adapted to move away from the other wall under tension and to return to its original position, the degree of tension and the friction of said walls being sufficient to squeeze said pouch therebetween and to permit said pouch to travel therebetween without undue restraint, the plane of both of said walls being substantially perpendicular to the direction of closing of said jaws.

In one embodiment each wall consists of a multiplicity of rollers.

In another embodiment the tension is provided by tension springs.

In yet another embodiment the movable wall has tension springs associated therewith at top and bottom of the wall and there is greater tension on the springs at the bottom than on the springs at the top.

In another embodiment there is (a) a pair of spreader fingers adapted to be inside said tubular film and to shape the tubular film towards a layflat configuration, such layflat configuration having longitudinal edges, thus spreading the longitudinal edges of said tubular film outwardly above said jaws, and (b) one or two pairs of detucker fingers which are adapted to act in unison with the transverse motion of the heat sealing jaws, located close to the heat sealing jaws and each pair of detucker fingers is adapted (i) to pinch a longitudinal edge of said tubular film such that when the tubular film has been pinched by the detucker fingers, the detucker fingers are close to such longitudinal edge of said tubular film, and (ii) to urge said pinched tubular film transversely in a direction substantially parallel to the closing surfaces of said jaws and away from the other longitudinal edge of said tubular film.

In another embodiment the reciprocating drive apparatus is the pair of jaws.

In a further embodiment there is one or two pairs of detucker fingers, and one of said spreader fingers is fixed and the other is adapted to float, the free ends of said spreader fingers being located close to and above said jaws.

In yet another embodiment there is one pair of detucker fingers, and one of said spreader fingers is fixed and the other is adapted to float, the free ends of said spreader fingers being located close to and above said jaws, said pair of detucker fingers being adapted to urge the opposing longitudinal edge of said tubular film away from said fixed spreader finger.

In yet another embodiment there are two pairs of detucker fingers, one pair being adapted to pinch and urge one longitudinal edge of said tubular film and the other pair being adapted to pinch and urge the other longitudinal edge of said tubular film, each pair being adapted to urge in opposing directions, said vertical form, fill and seal machine having two floating spreader fingers.

As used herein the term "float", as applied to a spreader finger, is intended to indicate that the spreader finger, while adapted to spread the tubular film outwardly, may move as a consequence of forces imparted to the spreader finger by the film by constrictions in the tubular film, for example, so-called easy-open features, which are described hereinafter, by normal lateral movement of the tubular film during the packaging process or as a result of other operating conditions. Floating may be effected by the use of compression or tension springs or other means associated with the spreader finger, as is known in the art.

In yet another embodiment there are two pairs of detucker fingers, one pair being adapted to pinch and urge one longitudinal edge of said tubular film and the other pair being adapted to pinch and urge the other longitudinal edge of said tubular film, each pair being adapted to urge in opposing directions, said form, fill and seal machine being devoid of spreader fingers.

In a preferred embodiment the detucker fingers are below the jaws.

In one embodiment each detucker finger is a springy metal leaf, one end of which is attached to a reciprocating drive apparatus, and the other end of which is curved to form, with a matching detucker finger, a gripping, non-poking surface for said film, the springiness of said leaf being selected such that said film, when gripped and urged is firmly gripped without damaging said film.

In another embodiment the curved end of the metal leaf is coated with polyurethane of high coefficient of friction.

In another embodiment each detucker finger is made from a flexible synthetic thermoplastic polymer of high coefficient of friction, arcuately shaped, and mounted such that the convex surfaces of the fingers are adjacent one another when the film is gripped.

In yet another embodiment the synthetic thermoplastic is a polyurethane.

In a further embodiment there is a chute above the jaws, said chute being adapted to shape said material-filled tubular film into a substantially oblong cross-section and to funnel the so shaped material-filled tubular film between said jaws.

The present invention also provides, on a vertical form, fill and seal machine which has (a) a pair of transverse heat sealing jaws with at least one of said jaws being capable of transverse motion and adapted to collapse a tubular film, horizontally, passing between said jaws, (b) a pair of spreader fingers adapted to be inside said tubular film and to shape the tubular film towards a layflat configuration, such layflat configuration having longitudinal edges, thus spreading the longitudinal edges of said tubular film outwardly, one of said spreader fingers being fixed, the free ends of said spreader fingers being located close to and above said jaws, and (c) one or two pairs of detucker fingers which are adapted to act in unison with the transverse motion of the heat sealing jaws, located close to the heat sealing jaws and each pair of detucker fingers being adapted (i) to pinch a longitudinal edge of said tubular film such that when the tubular film has been pinched by the detucker fingers, the detucker fingers are close to such longitudinal edge of said tubular film, and (ii) to urge said pinched tubular film transversely in a direction substantially parallel to the closing surfaces of said jaws and away from the other longitudinal edge of said tubular film.

In one embodiment there is one pair of detucker fingers which are adapted to urge said pinched tubular film transversely in a direction substantially parallel to the closing surfaces of said jaws and away from the fixed spreader finger.

The present invention also provides a process for packaging a flowable material on a vertical form, fill and seal machine which has a pair of transverse heat sealing jaws with at least one of said jaws being capable of transverse motion, and a pair of spreader fingers, one of which is fixed, said spreader fingers being adapted to shape a tubular film towards a layflat configuration having longitudinal edges, thus being adapted to spread the longitudinal edges outwardly above said jaws, said process comprising the steps of:

(i) forming a continuous tube of a synthetic thermoplastic polymeric film and filling aid tube with said flowable material;

(ii) causing said tube to travel between two jaws of a heat sealing device;

(iii) causing at least one of said jaws to travel towards the other jaw to collapse a transverse cross-section of the tube;

(iv) just before the jaws close to fully collapse the tube, causing a pair of detucker fingers which are located close to the heat sealing jaws, and are located at an end of said jaws opposite to the end of said jaws adjacent to said fixed spreader finger, to travel in a plane and direction parallel to the plane and direction of travel of said jaws and in unison with said jaws such that the fingers pinch the tubular film close to a longitudinal edge of said collapsing tube, and urge said pinched tube in a transverse direction substantially perpendicular to the direction of travel of said jaws and away from the fixed spreader finger;

(v) transversely heat sealing the collapsed portion of the tube to make an airtight seal across the tube;

(vi) repeating steps (ii) to (v) to form a pouch filled with said flowable material; and (vii) severing adjacent pouches from one another.

In one embodiment the transverse heat sealing and severing is accomplished in the same step.

In another embodiment severing of the pouches from one another is accomplished separately from the heat sealing step.

In a preferred embodiment the free ends of said spreader fingers are located close to and above said jaws.

In another embodiment there is a second pair of detucker fingers located close to the sealing jaws at an end adjacent to said fixed spreader finger, which cooperates with the other pair of detucker fingers, pinching the other longitudinal edge of the tubular film and urges said pinched tube in a transverse direction substantially perpendicular to the direction of travel of said jaws and away from the other longitudinal edge of the tubular film.

The present invention also provides a process for packaging a flowable material on a vertical form, fill and seal machine which has a pair of transverse heat sealing jaws with at least one of said jaws being capable of transverse motion, and additionally has a constraint chute below said jaws, said constraint chute comprising two vertical walls which permit a material-filled pouch to travel therebetween, one of said walls being permitted to move away from the other wall under tension and return to its original position, the degree of tension and the friction of said walls being sufficient to squeeze said pouch therebetween and to permit said pouch to travel therebetween without undue restraint, the plane of one of said walls being perpendicular to the direction of closing of said jaws, said process comprising the steps of:

(i) forming a continuous tube of a synthetic thermoplastic polymeric film and filling said tube with said flowable material;
(ii) causing said tube to travel between two jaws of a heat sealing device;
(iii) causing at least one of said jaws to travel towards the other jaw to collapse a transverse cross-section of the tube, said tube then having two longitudinal edges at the line of closure of said jaws;
(iv) transversely heat sealing the collapsed portion of the tube to make an airtight seal across the tube;
(v) repeating steps (ii) to (v) to form a pouch filled with said flowable material; and
(vi) severing adjacent pouches from one another.

In yet another embodiment, between steps (ii) and (iv) causing two pairs of detucker fingers, which are located close to the heat sealing jaws, to travel in a plane and direction parallel to the plane and direction of travel of said jaws and in unison with said jaws such that the detucker fingers pinch the tubular film close to the edges of the collapsing tube and such that one pair of detucker fingers pinches and urges a longitudinal edge of said tubular film and the other pair of detucker fingers pinches and urges the other longitudinal edge of said tubular film, each pair being adapted to urge in opposing directions, said vertical form, fill and seal machine being devoid of spreader fingers.

In one embodiment each wall consists of a multiplicity of rollers.

In another embodiment the tension is provided by tension springs.

In yet another embodiment the movable wall has tension springs associated therewith at top and bottom of the wall and there is greater tension on the springs at the bottom than on the springs at the top.

In a further embodiment, between steps (i) and (ii) there is a chute above the jaws which shapes said material-filled tubular film into a substantially oblong cross-section and funnels the so shaped material-filled tubular film between said jaws.

In another embodiment, between steps (i) and (ii) there are a pair of spreader fingers inside the tubular film which shape the tubular film towards a layflat configuration having longitudinal edges, thus spreading the tubular film outwardly above said jaws.

In another embodiment, just before the jaws fully collapse the tube, one or two pairs of detucker fingers, which are located close to the heat sealing jaws, each pair of detucker fingers are caused (i) to pinch a longitudinal edge of said tubular film such that when the tubular film has been pinched by the detucker fingers, the detucker fingers are close to such longitudinal edge of said tubular film, and (ii) to urge said pinched tubular film transversely in a direction substantially parallel to the closing surfaces of said jaws and away from the other longitudinal edge of said tubular film.

In yet another embodiment the detucker fingers are caused to operate by attachment to the jaws.

In a further embodiment one the spreader fingers is fixed and the other is allowed to float.

In another embodiment, one of the spreader fingers is fixed and the other is allowed to float, the free ends of said spreader fingers being located close to and above said jaws, and just before the jaws fully collapse the tube, one pair of detucker fingers which are located close to the sealing jaws and at an end of said jaws opposite to the end of said jaws adjacent to said fixed spreader finger, causing the detucker fingers to travel in a plane and direction parallel to the plane and direction of travel of said jaws and in unison with said jaws such that the fingers pinch the tubular film close to the longitudinal edge of said collapsing tube, and urge said pinched tube in a transverse direction substantially perpendicular to the direction of travel of said jaws and away from the fixed spreader finger.

In a preferred embodiment the detucker fingers are below the jaws.

In a further embodiment each detucker finger is a springy metal leaf, one end of which is attached to a reciprocating drive apparatus, and the other end of which is curved to form a gripping, non-poking surface for said film, the springiness of said leaf being selected such that said film, when gripped and urged so firmly gripped without damaging said film.

In another embodiment the curved end of the metal leaf is coated with polyurethane of high coefficient of friction.

In yet another embodiment each detucker finger is made from a flexible synthetic thermoplastic polymer of high coefficient of friction, arcuately shaped, and mounted such that the convex surfaces of the fingers are adjacent one another when the film is gripped.

In another embodiment the synthetic thermoplastic is a polyurethane.

In a preferred embodiment the detucker fingers are attached to the undersides of said jaws.

In yet another embodiment the tubular film is guided towards said jaws by a chute above said jaws, said chute also shaping the material-filled tubular film into a substantially oblong cross-section.

In another embodiment the pouch so-formed has a heat-sealed area at or adjacent to one of the transverse seals at a corner of said pouch, said heat-sealed area joining the so-called front and back walls of said pouch and having a slit or perforation therein extending from the free edge of the heat-sealed area.

In yet another embodiment the pouch has a small compartment adjacent one of the transverse heat seals, and separated from the portion of the pouch containing the flowable material by a heat seal which joins the so-called front and back walls of said pouch, said compartment having therein a slit or perforation substantially parallel to said transverse heat seal.

In a further embodiment the pouch is heat sealed transversely at both ends and has a heat sealed, lapped back seam.

Known vertical form, fill and seal machines may be used for forming a tube, for forming the back seam, the transverse heat seals and for severing the pouch. The detucker fingers of the present invention are added to such machines, and preferably attached to the transverse heat sealing jaws.

In those embodiments having a slit in a heat-sealed portion of the pouch, certain modifications are required to the packaging machine. Pouches with slits as described above are sometimes referred to as "easy open" pouches. A method of making such a pouch is disclosed herein.

The present invention is described further herein. Additionally, although there are a number of ways in which to provide the heat-sealed area and slit, one way is described in more detail herein, sometimes with reference to the drawings.

Films that are useful for packaging flowable materials include polyethylene and laminates of polyethylene with other films, e.g. nylon. The laminates are particularly useful for hot-fill packaging. Films and film laminates may be referred to hereinafter as "film".

Figure 1:
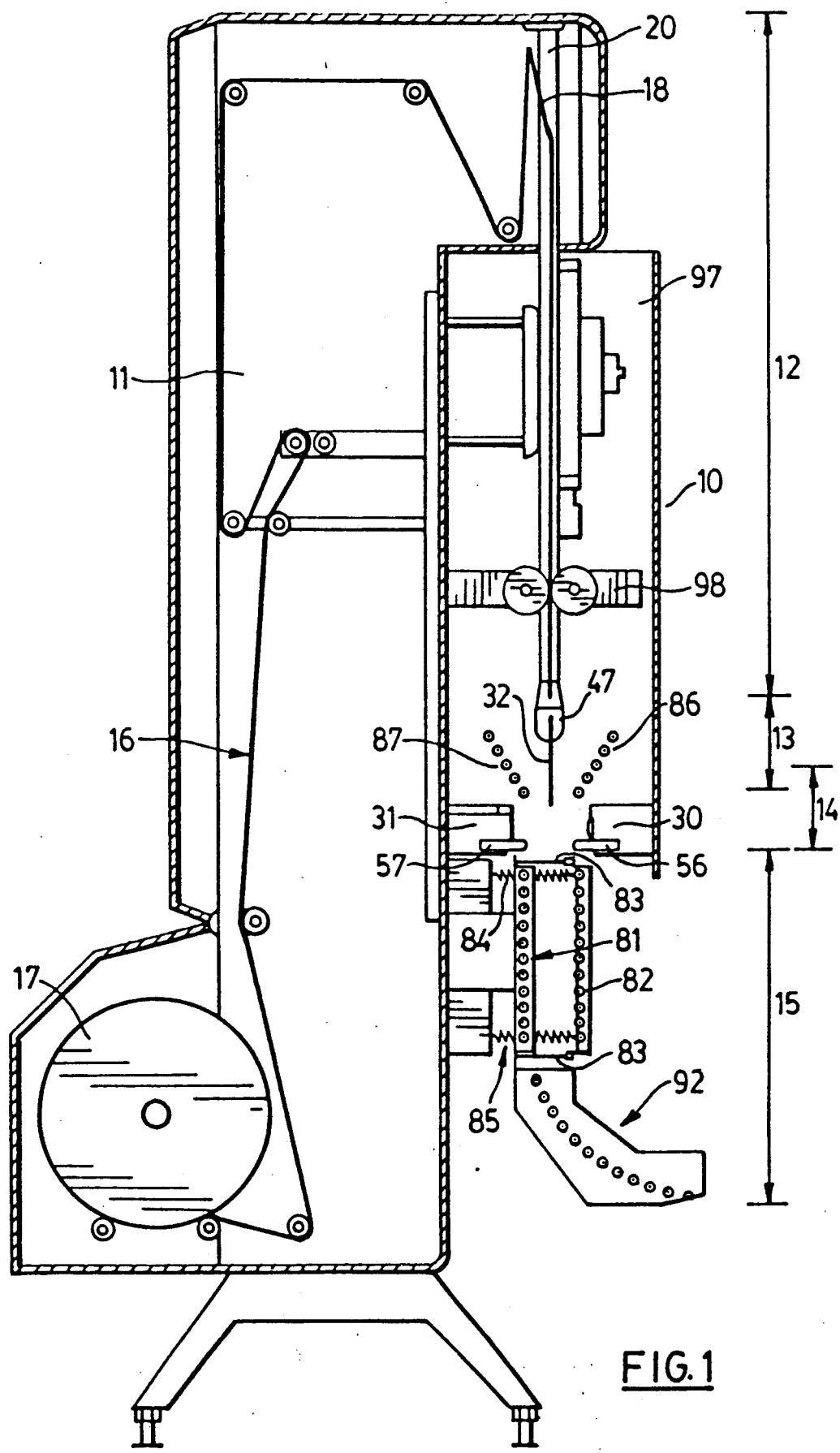
FIG. 1 is a schematic view of a vertical form, fill and seal machine incorporating embodiments of the present invention.
Figure 2:
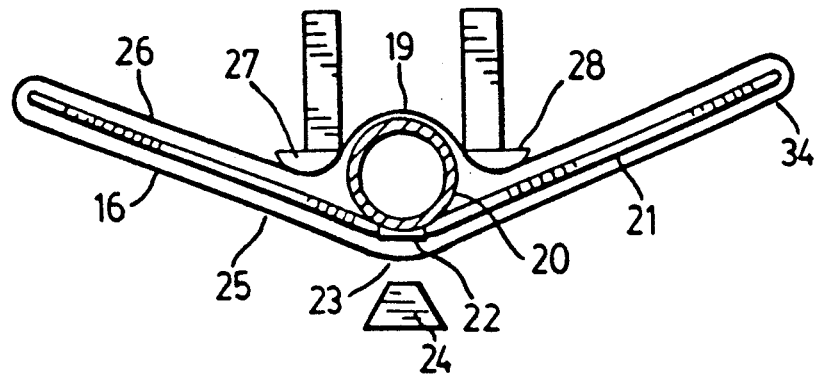
FIG. 2 shows a plan view of a filling tube and film diverter useful in such a form, fill and seal machine.

Referring to FIG. 1 the vertical form, fill and seal machine 10 comprises a film unwinding section 11, a tube forming section 12, a filling section 13, a pouch forming section 14 and a discharge section 15. Film 16 is unwound from roll 17 and the web of film is formed into tubular form using film folding "horn" 18 such that longitudinal edges of the film 16 overlap. As shown in FIG. 2 the film 16, now in essentially tubular form 19, surrounds fill-tube 20 and tube-forming plate 21. Fill tube 20 may have a heat-seal backing plate 22 thereon for assisting in forming a heat-sealed back seam 23 with a vertical heat sealing jaw 24 of longitudinal heat sealing device 97. It has been found that it is preferable to substantially equalize the lengths of the front wall 25 and back wall 26 of the film tube using film diverters 27 and 28, or similar.

Film diverters 27 and 28 may be made of metal and preferably have low-slip surfaces in contact with the film, e.g. have been coated with a non-stick finish.

Figure 5:
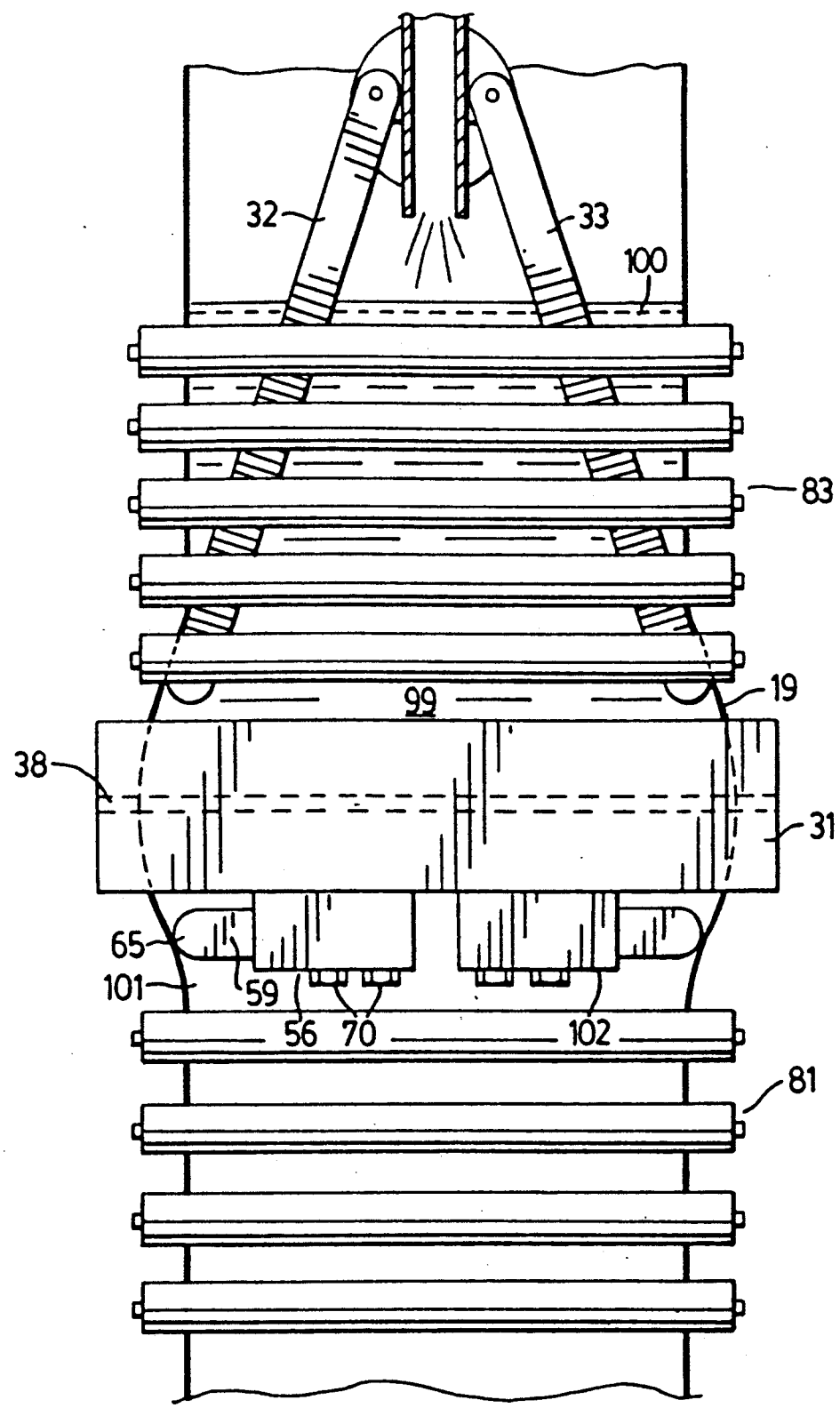
FIG. 5 is a side view of the embodiment shown in FIG. 4.

The tubular film 19 is prepared for entry to the gap between jaws 30 and 31 by starting to elongate the cross-section of tubular film 19, by means of spreader fingers 32 and 33 which are shown more clearly in FIG. 5.

Figure 9:
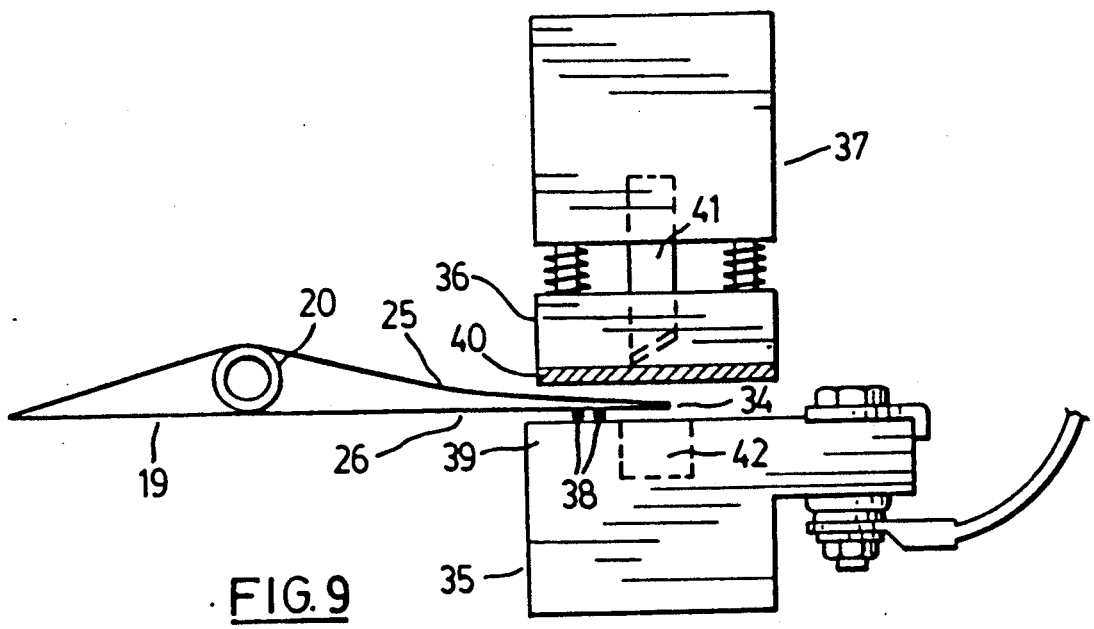
FIG. 9 shows a plan view of the compartment sealing device, exaggerated in size with respect to the fill tube and pouch shown therein.
Figure 3:
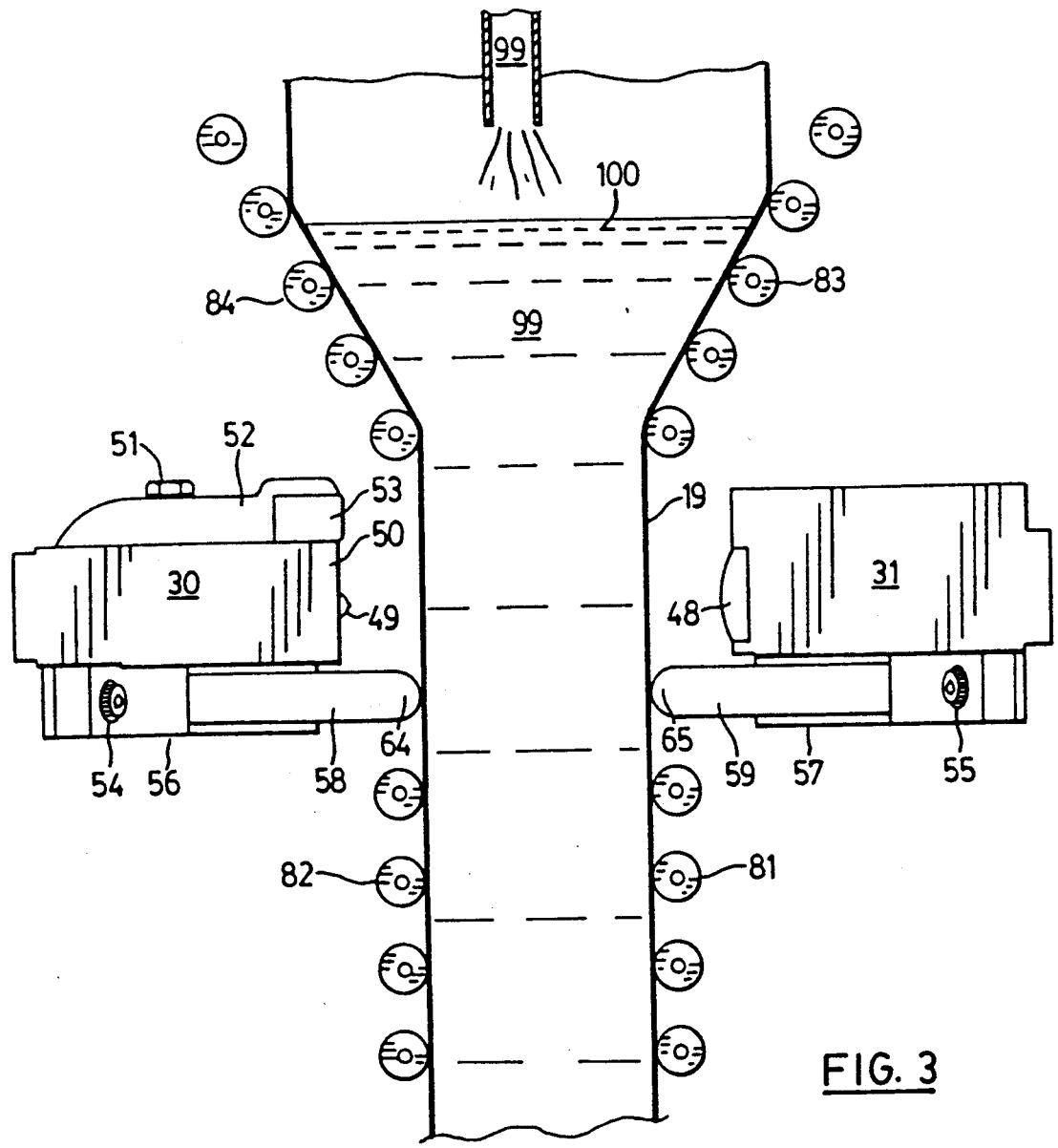
FIG. 3 is a cross-sectional view of the transverse heat sealing jaws in the open position.

Immediately after the tubular film 19 passes the end of tube forming plate 21, the substantially flattened edge portion 34 of the tube passes between jaws 35 and 36 of compartment sealing device 37, as shown in FIG. 9. Jaw 35 comprises an electrical impulse sealer 38, mounted on a water-cooled block 39. A layer of polytetrafluoroethylene-impregnated glass fibre tape (not shown) separates the impulse sealer from the sealing jaw, as is known in the art. A pad of rubber or other flexible back-up material 40 is mounted on the face of jaw 36. The impulse sealer 38 and pad 40 may be prevented from sticking to the film by interposing layers of polytetrafluoroethylene-impregnated glass fibre tape (not shown). Located within jaw 36 is a knife blade 41 which is adapted to be moved from the position shown to a position in cavity 42 in jaw 35.

In operation, the flattened edge portion 34 on tubular film 19 is passed between jaws 35 and 36. Jaws 35 and 36 are closed, pressing the front and back walls 25 and 26 of the film between the impulse sealer 38 and pad 40. Knife blade 41 is then thrust through the edge portion 34 of film to form a slit. An electrical impulse, fed through electrical connections (not shown), heats the impulse sealer 38 sufficiently to seal the inner layers of the film together.

Figure 10:
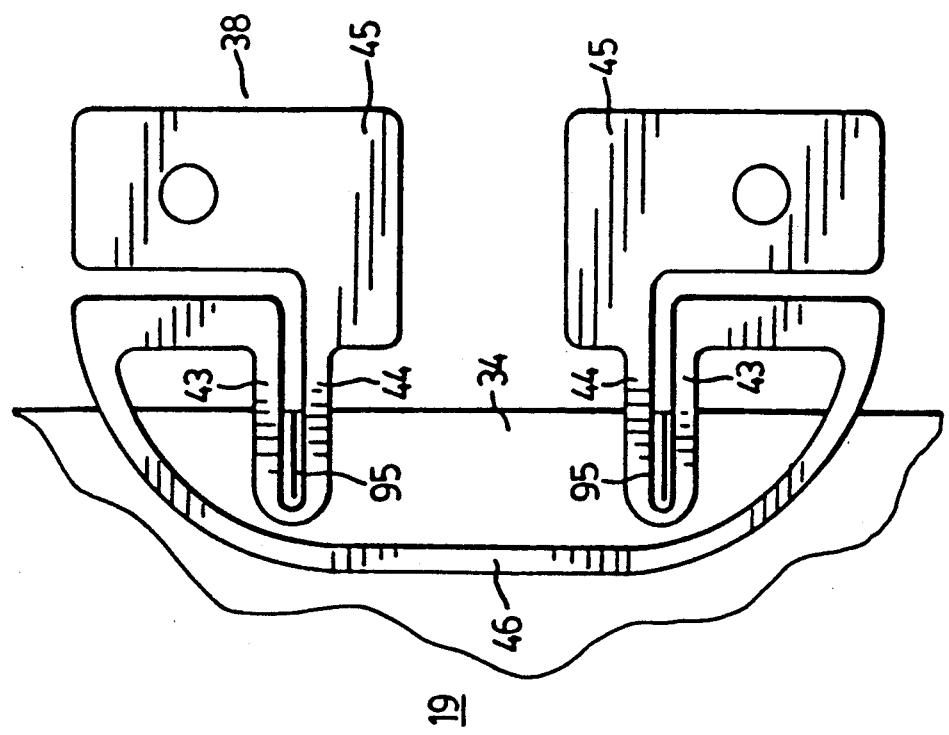
FIG. 10 shows a plan view of a heat sealing element for the compartment sealing device.

A preferred embodiment of the shape of the compartment-forming impulse sealing element is shown in FIG. 10. The compartment-forming electrical impulse sealer 38 comprises first and second elements. The first elements comprise U-shaped elements with straight leg portions 43 and 44 joined together. One straight leg portion 44 of each U-shaped element is joined to a plate 45, which is adapted to be connected to an electrical connection. The other straight leg portions 43 are connected by second element 46, which is spaced apart from the U-shaped first elements and in the same plane as the first elements.

The tubular film is then advanced, downwardly, past the discharge end 47 of fill tube 20 to a transverse impulse sealer. The transverse impulse sealer comprises two jaws 30 and 31. Jaw 31 has a silicone backing pad 48 embedded therein. Jaw 30 comprises an electrical impulse sealing element 49 mounted on water-cooled block 50. A layer of polytetrafluoroethylene-impregnated glass fibre tape (not shown) separates the impulse sealer from block 50, as is known in the art. Impulse sealing element 49 may be prevented from sticking to the film 19 by interposing layers of polytetrafluoroethylene-impregnated glass fibre tape (not shown). Attached to block 50, by nut 51, is clamp 52 in which is embedded silicone clamping pad 53. The function of pad 53 is to pinch film tube 19 between jaws 30 and 31 and hold the pinched, collapsed tube steady while heat sealing element 49 is heated and cooled in order to heat seal and sever film tube 19 at line A, shown in FIG. 4.

Figure 6:
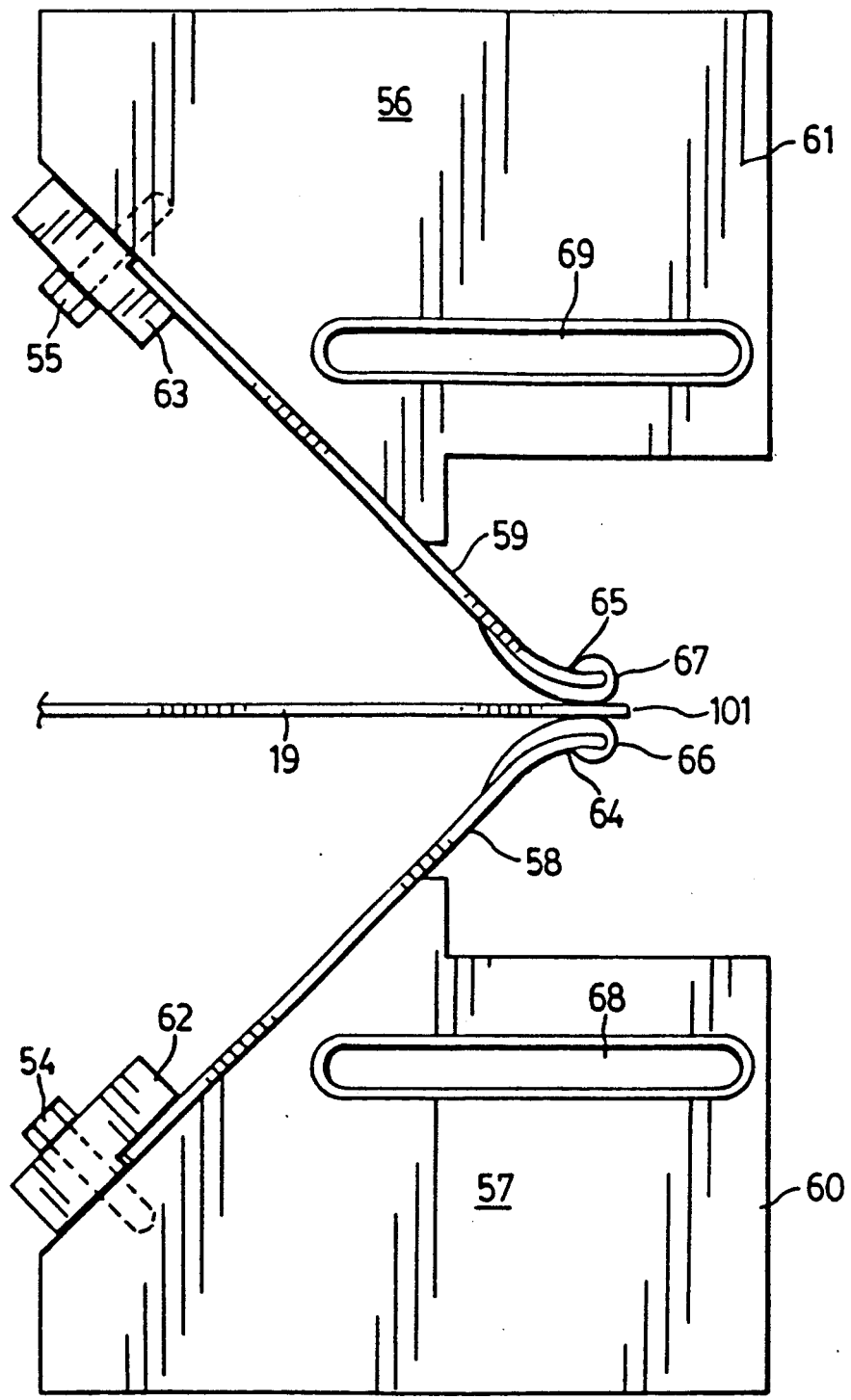
FIG. 6 is a plan view of one embodiment of a pair of cooperating detucker fingers.

Attached to jaws 30 and 31 by bolts 54 and 55 are detucker devices 56 and 57 respectively. As is seen more clearly in FIG. 6 each detucker device 56 and 57 has a metal leaf spring 58 and 59 respectively. The metal leaf springs 58 and 59 are clamped at one end to detucker bodies 60 and 61, respectively, by spring clamps 62 and 63 respectively. The free ends 64 and 65 of leaf springs 58 and 59 are curved and coated with high coefficient of friction materials, e.g. polyurethane, 66 and 67 respectively. Slots 68 and 69 are for attaching detucker devices 56 and 57 to jaws 30 and 31 by bolts such as 70 shown in FIG. 5.

Figure 7:
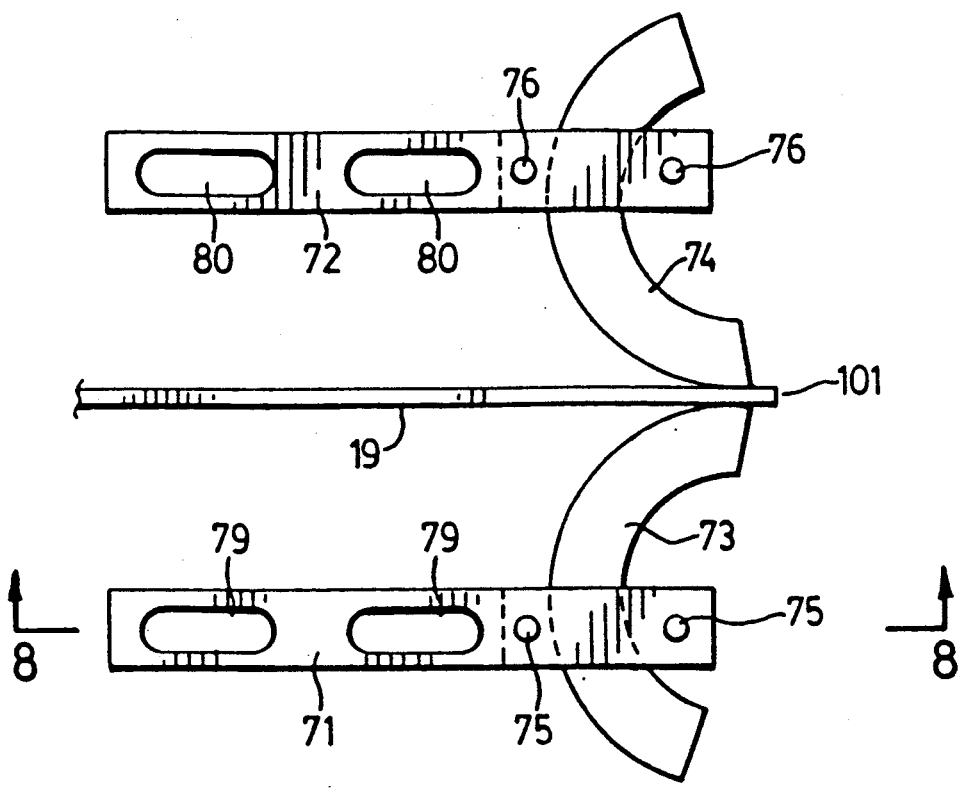
FIG. 7 is a plan view of another embodiment of cooperating detucker fingers.
Figure 8:
FIG. 8 is a side view of the embodiment shown in FIG. 7.

An alternate detucker device is shown in FIGS. 7 and 8 wherein detucker bodies 71 and 72 are forked at one end such that detucker fingers 73 and 74, made of a bendable, high coefficient of friction material, e.g. a polyurethane, are firmly held therein by bolts 75, 76 and nuts 77, 78 (nut 78 is not shown but is attached to bolt 76). Slots 79 and 80 are for attaching the detucker bodies to jaws 30 and 31.

The coefficient of friction of the portions of the detucker fingers which contact the film must be sufficient to be able to grip the film firmly, especially when the collapsed edge of the film is being pulled by the detucker fingers.

In order to assist in the production of pouches which are not filled to capacity (sometimes referred to as slack pack pouches), the tubular film 19 may be constrained with a chute below the heat sealing jaws, defined by roller assemblies 81 and 82 (shown in FIGS. 1, 3, 4 and 5). The minimum distance between roller assemblies 81 and 82 is determined by stops 83. Springs 84 and 85 are attached to the top and bottom, respectively, of roller assembly 82. The springs 84 and 85 allow roller assembly 82 to move away from stops 83 when expansive pressure is applied between roller assemblies 81 and 82, and to return to its original position at stops 83 when the pressure is released. Further, it is preferred that when hot filling tubular film 19, such tubular film is guided towards the gap between heat sealing jaws 30 and 31 by a narrowing chute, defined by roller assemblies 86 and 87. As a result of such guidance the tubular film is caused to be shaped into an oblong cross-section.

Figure 11:
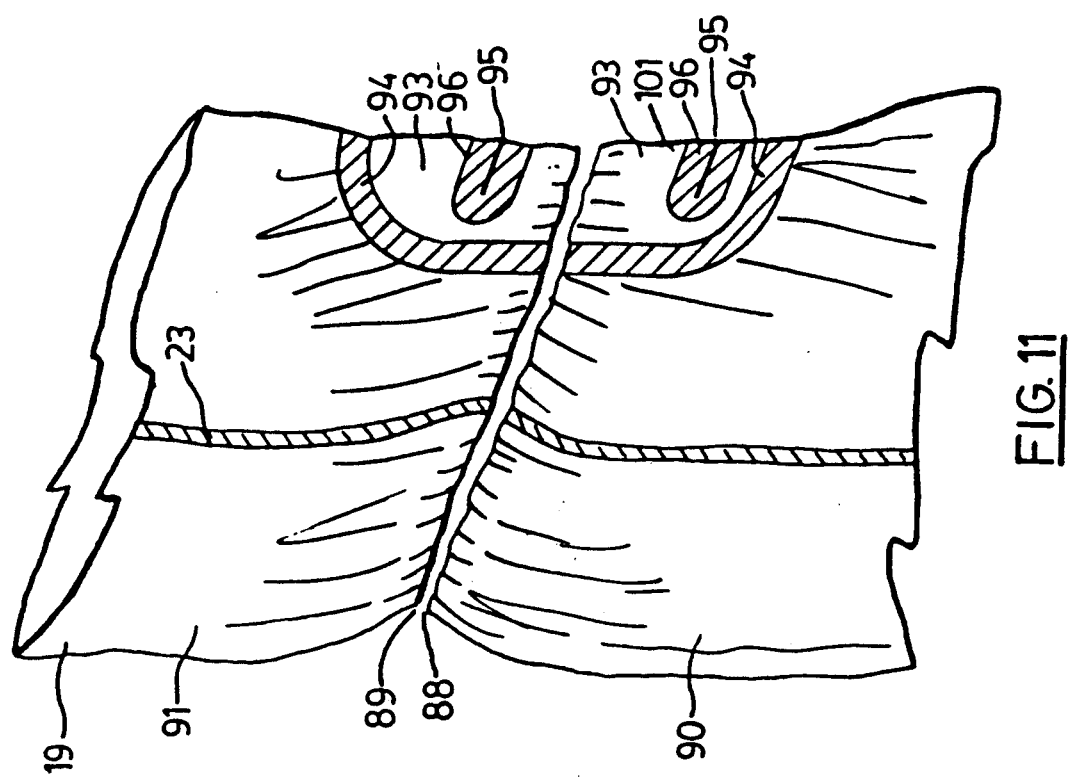
FIG. 11 shows the top of one pouch and the bottom of an adjacently-formed pouch, each with the heat-seal and slit feature.

The heat sealing element 49 seals tubular film 19 transversely and also severs the tubular film, so that a top heat seal 88 and a bottom heat seal 89 are formed on adjacent pouches 90 and 91, as shown in FIG. 11. After forming pouch 90, the pouch will be allowed to drop under its own weight, through the chute defined by roller assemblies 81 and 82 and thence via chute 92 to a pouch collection and packaging stage (not shown).

After forming transverse seals 88, 89 as shown in FIG. 11, the upper unclosed pouch 91 is filled with a known quantity of flowable material through fill tube 20. The flowable material may be filled to a position in the tube which permits air to be excluded from pouch 91.

The small compartment 93, if present, is formed by heat seal 94, using the apparatus described hereinabove (FIG. 10), or similar. The seal 94 is intended to separate the slit 95 from the contents of the pouch to maintain the contents within the pouch until required. The seal 96 surrounding the slit is intended to prevent ingress of material, e.g. water, food, bacteria, from entering and contaminating the interior of compartment 93.

The slit 95 may be replaced by at least one perforation. The slit is intended as a device for starting a tear and for directing the tear in a preferred direction. It has been found that invariably the tear stops at the back seam 23. This is advantageous in that the torn film will not separate from the pouch. The torn portion may provide a convenient "handle" while pouring out the contents of the pouch and therefore may not be inadvertently dropped, or lost. This is an important feature for health reasons, and customer satisfaction.

Other kinds of easy-tear features maybe used. For example the edge of the pouch may merely be heat-sealed with a semicircular heat seal with a slit therein.

In operation, the film 16 is allowed to unwind from roll 17 and is formed into tubular film by forming horn 18. The longitudinal edges of the film may overlap and such edges are sealed together in heat sealing device 97. The tubular film 19 so-formed is advanced by rollers 98 and travels downwards through the throat formed with roller assemblies 86 and 87, between jaws 30 and 31 and between roller assemblies 81 and 82. Flowable material 99 is caused to flow, e.g. is gravity fed or pumped, through fill tube 20 and emanates from the end of fill tube 47. The flowable material 99 enters tubular film 19 and is prevented from egress from the tube by transverse heat seal 89. The flow of flowable material 99 may be continuous or intermittent as is known in the art.

Figure 4:
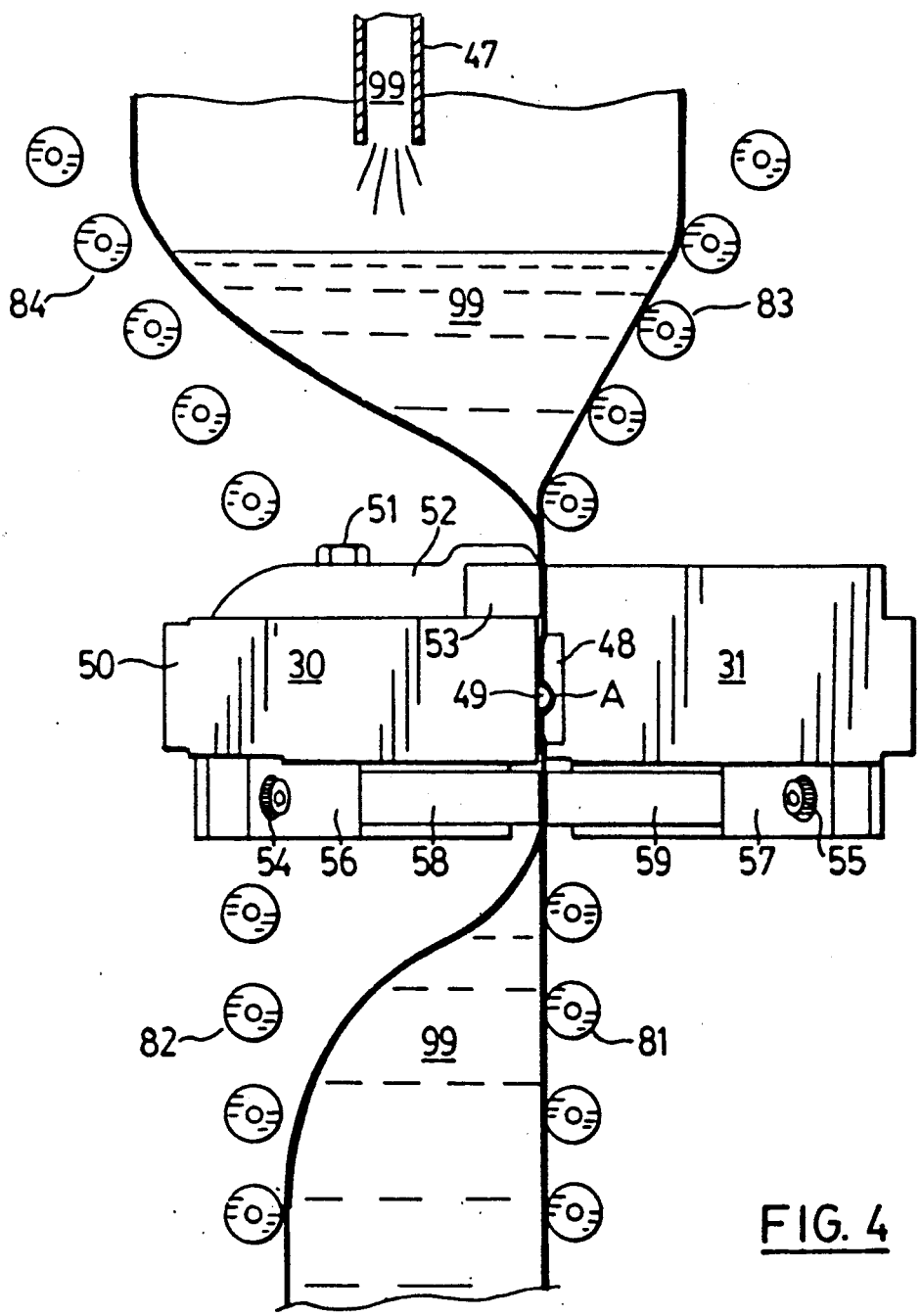
FIG. 4 is a cross-sectional view of the transverse heat sealing jaws in the closed position.

If the pouch 90 is intended to have an air space inside the top of the pouch, sufficient flowable material is allowed to enter tubular film 19 so that just prior to the closing of jaws 30 and 31, the material/air interface is below the heat seal line A. If the pouch 90 is intended to have no air inside the pouch, the flowable material/air interface 100 is permitted to rise above the heat seal line A, as shown in FIG. 4. The slackness of the pouch is governed by the distance between roller assemblies 81 and 82 in relation to the diameter of tubular film 19. Roller assembly 81 is fixed, while roller assembly 82 may be slightly pushed apart from roller assembly 82 by pouch 90. The travel of roller assembly 82 is governed by a stop (not shown) and springs 84 and 85, or other means, e.g. pneumatic means. With respect to the selection of suitable springs, ideally the springs should be sufficiently weak to allow roller assembly 82 to be moved away from roller assembly 81 as a result of hydraulic forces within pouch 90 caused by the closing of the jaws and yet sufficiently strong to constrain pouch 90 when the jaws are open, in such a way that tubular film 19, above closed end 89, is not allowed to "balloon out" as a result of the head of material in and above the next-to-be-formed pouch. The constraining action may be sufficient that the material/air interface 100 is maintained above heat seal line A, or the pouch 90 is squeezed such that after completion of the pouch the pouch is underfilled and forms a slack package. It is preferable that the top spring 84 is weaker than the bottom spring 85 because head of material in the pouch places greater tension on the bottom spring than the top one. The ability of the roller assembly 82 to "float" is particularly important for pouches made with relatively inextensible films and for slack pack pouches. Selection of the spring tensions is a matter of simple experimentation.

As indicated heretofore, when the flowable material being packaged is hot, the tubular film tends to be less easily controlled. Prior to the present invention, tucks tended to form at the transverse seal. Tuck formation is alleviated in the present invention by the detucker fingers, especially when used in combination with constraint rollers 81 and 82, and/or infeed roller assemblies 86 and 87, and/or spreader fingers 32 and 33. As jaws 30 and 31 are closed, the tips 64 and 65 of detucker fingers 56 and 57 are brought together, clamping the longitudinal edges 101 of tubular film 19 therebetween. The polyurethane coating 66, 67 tends to grip the film, and when jaws 30 and 31 are fully closed, detucker finger devices which comprise leaf springs 58 and 59 have gripped edge 101 of tubular film and urged the film outwards, away from the longitudinal axis of tubular film 19. It has been found that one pair of detucker fingers is sufficient if there is also an opposing fixed spreader finger, e.g. spreader finger 32 and detucker device 102 in FIG. 5, and the tip of spreader finger 32 is relatively close to jaws 30 and 31, to prevent the detucker device 102 from merely moving the whole of tubular film transversely. It has also been found that two pairs of detucker fingers, e.g. 56 and 102 as shown in FIG. 5, in combination with infeed roller assemblies 86 and 87 and roller assemblies 81 and 82, may eliminate the need for spreader fingers 32 and 33.

In cases where the easy-open feature, e.g. compartment 93 and slit 95, has been added to pouch 90 the edge 101 of tubular film 19 has usually been delineated by the heat seals 94 and 96. In such instances the spreader finger which is inside tubular film 19, on the same side as heat seals 94, 96, must not be fixed. Such a spreader finger may be sprung or otherwise allowed to "float" to allow the tubular film to pass the spreader fingers with minimal interference.

A preferred detucker finger device is as shown in FIGS. 7 and 8 wherein the whole of the finger comprises a flexible arcuate section of a high friction material, e.g. polyurethane. The advantage of this type of detucker finger compared to the leaf spring type is the ease of construction, compactness and insensitivity to damage in operation.

Selection of combinations of spreader fingers, infeed roller assemblies and constraint roller assemblies is governed by a number of factors, some of which will be apparent from the following discussion. It has been found that pouches with an easy-tear feature thereon have, heretofore, tended to have a problem with tucks in the transverse heat seal adjacent to the easy-tear feature. The problem is accentuated when the pouches are filled in hot-fill processes. In hot-fill processes it is more desirable to incorporate constraint rollers 81 and 82, and even more desirable to incorporate infeed rollers 86 and 87 in addition to the constraint rollers. The infeed and constraint rollers assist in preventing hang-ups of the pouches at jaws 30 and 31 caused by the tackiness of the hot film. Such hang-ups are a particular problem with pouches which are not slack (so-called fat pouches) where contact with the jaws is greater. Additionally hang-ups are a problem with pouches of low weight, e.g. about 140 g, because there may be insufficient weight for the pouch to fall easily away from the polytetrafluoroethylene-impregnated glass fibre tape which covers the opening heat sealing jaws 30 and 31. Constraint rollers 81 and 82 provide means for helping to strip any small pouches which may have become stuck to the glass fibre tape. The infeed rollers 86 and 87 are not required in some circumstances, for instance in cold fill operations. The constraint roller assemblies 81 and 82 are useful in helping to eliminate air from the pouches, relieving the hydraulic stress when the jaws are closed, alleviating the problems of hang-up with fat or small pouches and for controlling pouch slackness. The positioning of the stops 83 will control the extent of slackness in the pouch, as will be apparent to one skilled in the art. As may be appreciated it would be preferable for there not to be any spreader fingers, especially for pouches made with an easy-open feature and/or for hot-fill processes. Both spreader fingers may be removed if two pairs of detucker fingers are used in combination at least with constraint roller assemblies and, preferably, with infeed roller assemblies.

The term "flowable material" does not include gases but encompasses materials which are flowable under gravity or may be pumped. Such materials include emulsions, e.g. ice cream mix; soft margarine; food dressings; pastes, e.g. meat pastes; peanut butter; preserves, e.g. jams; pie fillings; marmalade; jellies; dough; ground meat, e.g. sausage meat; powders, e.g. gelatin powders; detergents; liquids, e.g. milk; oils; and granular solids, e.g. rice; sugar.

The present invention may be illustrated by reference to the following examples:

EXAMPLE I

Two pairs of detucker fingers, substantially as shown in FIGS. 7 and 8, comprising a metal body and a polyurethane rubber detucker finger having a Durometer hardness of about 80 and having inner and outer radii of the arc of 12.5 and 32 mm respectively were mounted on the bottom of the transverse jaws of a PREPAC IS-3 (trade mark) vertical form, fill and seal machine. The spreader fingers on this machine were removed and constraint rollers, substantially as shown in FIGS. 1, 3, 4 and 5 were installed on such machine. Heated ice cream topping was packaged at a rate of thirty five 2-liter pouches per minute in a 115 $\mu$m thick polyethylene film/biaxially oriented ethylene/vinyl alcohol film/polyethylene film laminate. Examination of the filled pouches showed none had tucks on the top or bottom transverse seals. Seal integrity, as judged by a flat plate force test (75 kg mass placed on top of a flat steel plate with a pouch sandwiched between this steel plate and another, horizontal, flat steel plate), was judged to be excellent as a result of there being no leakers.

The detuckers were removed from the machine and the experiment repeated for comparison purposes. Virtually all of the pouches had tucks on the top and/or bottom transverse seals. Seal integrity, as judged from the above flat plate force test, was judged inferior as a result of about 2% leakers.

FURTHER EXAMPLES

A number of other experiments were performed with various combinations of infeed rollers, constraint rollers, detucker fingers and spreader fingers on a PREPAC IS-3 form, fill and seal machine. The Table below shows the various configurations used in the experiments and the results obtained therewith. The tuck ratings shown in the Table are qualitative ratings based upon the accumulative experience from a number of individual observations over a period of several months on several PREPAC IS-3 form, fill and seal machines used to package a variety of flowable materials. As will be apparent from the Table, the tuck ratings are dependent, to a degree, upon the size of the pouches, whether the flowable material being packaged is packaged by a hot-fill process or a cold-fill process, and whether the pouches have an easy-open feature or not.

TABLE

| | TUCK RATINGS | | | | | | | |
|---|---|---|---|---|---|---|---|---|
| | 1.5 TO 2 L POUCHES | | | | LESS THAN 0.5 L POUCHES | | | |
| | HOT-FILL | | COLD-FILL | | HOT-FILL | | COLD-FILL | |
| HARDWARE EMPLOYED | W/O EO | WITH EO | W/O EO | WITH EO | W/O EO | WITH EO | W/O EO | WITH EO |
| A | N/A | N/A | 4.5 | 3 | 4.5* | 3* | 5* | 4* |
| A + E | 4 | 1 | 5 | 3 | 4.5 | 3 | 5 | 4 |
| B + C | N/A | N/A | 5 | 5 | 5* | 5* | 5* | 5* |
| B + C + E | 5 | 5 | 5 | 5 | 5 | 5 | 5 | 5 |
| E | 1 | 1 | 2 | 1 | 2 | 1 | 3 | 2 |
| D | N/A | N/A | 2 | 1 | 2* | 1* | 3* | 2* |
| D + E | 5 | 5 | 5 | 5 | 5 | 5 | 5 | 5 |
| D + A | N/A | N/A | 5 | 5 | 5* | 5* | 5* | 5* |

Wherein:
A = 1 pair of spreader fingers, both of which are floating
B = 1 pair of spreader fingers, one of which is fixed and the other is floating
C = 1 pair of detucker fingers
D = 2 pairs of detucker fingers
E = Constraint rollers and infeed rollers
EO = Easy-open feature
W/O = Without
N/A = Unable to run satisfactorily, primarily because of hang-ups
* = Pouches often stuck to the horizontal sealing jaw The tuck rating reflects the combination of the number and size of tucks. Rating 5 indicates that there were substantially no tucks; rating 1 indicates that there were several tucks and/or at least one large tuck; and ratings 2 to 4 indicate gradations therebetween.

The experiments wherein the machine included one pair of spreader fingers only, both of which were floating, i.e. Hardware A, were of the prior art. It will readily be seen that hot-fill processes either give poor tuck ratings as shown for the small pouches, or the process is untenable because of hang-ups, as with large pouches.

The experiments wherein the machine included two pairs of detucker fingers only, i.e. Hardware D, is in accordance with the teachings of U.S. Pat. No. 4,534,159 to R. C. Kelly. It will be seen that this arrangement gives very poor tuck ratings.

LIST OF PARTS

10 Vertical form, fill and seal machine
11 Film unwinding section
12 Tube forming section
13 Filling section
14 Pouch forming section
15 Discharge section
16 Film
17 Film roll
18 Folding horn
19 Tubular film
20 Fill tube
21 Tube forming plate
22 Heat seal backing plate
23 Heat sealed back seam
24 Vertical heat seal jaw
25 Front wall of tube
26 Back wall of tube
27 Film diverter
28 Film diverter
30 Transverse heat seal jaw
31 Transverse heat seal jaw
32 Spreader finger
33 Spreader finger
34 Flattened edge portion of film
35 Heat seal jaw
36 Heat seal jaw
37 Compartment sealing device
38 Electrical impulse sealer
39 Water-cooled block
40 Flexible back up material
41 Knife blade
42 Cavity
43 Straight leg portions of first element of sealer 38
44 Straight leg portions of first element of sealer 38
45 Plate of sealer 38
46 Second element of sealer 38
47 Discharge of fill tube
48 Silicone backing pad
50 Block
51 Nut
52 Clamp
53 Silicone clamping pad
54 Bolt
55 Bolt
56 Detucker finger device
57 Detucker finger device
58 Leaf spring
59 Leaf spring
60 Detucker body
61 Detucker body
62 Spring clamp
63 Spring clamp
64 Free end of leaf spring
65 Free end of leaf spring
66 Friction material
67 Friction material
68 Slot
69 Slot
70 Bolt
71 Detucker body
72 Detucker body
73 Detucker finger
74 Detucker finger
75 Bolt
76 Bolt
77 Nut
78 Nut
79 Slot
80 Slot
81 Roller assembly (fixed)
82 Roller assembly (moveable)
83 Stops
84 Spring
85 Spring
86 Infeed roller assembly 87 Infeed roller assembly
88 Top transverse heat seal
89 Bottom transverse heat seal
90 Closed pouch
91 Unclosed pouch
92 Chute
93 Small compartment
94 Heat seal
95 Slit
96 Heat seal
97 Longitudinal heat sealing device
98 Advancement rollers
99 Flowable material
100 Material/air interface
101 Longitudinal edge of tubular film
102 Opposing detucker finger device

We claim:

1. In a vertical form, fill, and seal machine which has a pair of transverse heat sealing jaws with at least one of said jaws being capable of transverse motion and adapted to collapse of a tubular film, horizontally, passing between said jaws, the improvement comprising a constraint chute below said jaws, said constraint chute comprising two vertical walls which are adapted to permit a material-filled pouch to travel therebetween, said pouch being formed by transversely heat sealing a material-filled tubular film at intervals, using said jaws to form said seals, one of said walls being adapted to move away from the other wall under tension and to return to its original position, the degree of tension and the friction of said walls being sufficient to squeeze said pouch therebetween and to permit said pouch to travel therebetween without undue restraint, the plane of both of said walls being perpendicular to the direction of closing of said jaws, wherein the movable wall has tension springs associated therewith at top and bottom of the wall and there is greater tension on the springs at the bottom than on the springs at the top.

2. The a vertical form, fill, and seal machine of claim 1, wherein each wall of the constraint chute consists of a multiplicity of rollers.

3. A vertical form, fill and seal machine which has (a) a pair of transverse heat sealing jaws with at least one of said jaws being capable of transverse motion and adapted to collapse a tubular film, horizontally, passing between said jaws, (b) a pair of spreader fingers adapted to be inside said tubular film and to shape the tubular film towards a layflat configuration, such layflat configuration having longitudinal edges, thus spreading the longitudinal edges of said tubular film outwardly, one of said spreader fingers being fixed, the free ends of said spreader fingers being located close to and above said jaws, and (c) at least one pair of detucker fingers which are adapted to act in unison with the transverse motion of the heat sealing jaws, located close to the heat sealing jaws and adapted (i) to pinch a longitudinal edge of said tubular film such that when the tubular film has been pinched by the detucker fingers, the detucker fingers are close to such longitudinal edge of said tubular film, and (ii) to urge said pinched tubular film transversely in a direction substantially parallel to the closing surfaces of said jaws and away from the other longitudinal edge of said tubular film.

4. A vertical form, fill and seal machine according to claim 3 wherein each detucker finger is a springy metal leaf, one end of which is attached to a reciprocating drive apparatus, and the other end of which is curved to form, with a matching detucker finger, a gripping, non-poking surface for said film, the springiness of said leaf being selected such that said film, when gripped and urged is firmly gripped without damaging said film.

5. A vertical form, fill and seal machine according to claim 4 wherein the reciprocating drive apparatus is the pair of jaws.

6. A vertical form, fill and seal machine according to claim 3 wherein there is one pair of detucker fingers which are adapted to urge said pinched tubular film transversely in a direction substantially parallel to the closing surfaces of said jaws and away from said fixed spreader finger.

7. In a vertical form, fill and seal machine which has a pair of transverse heat sealing jaws with at least one of said jaws being capable of transverse motion and adapted to collapse of a tubular film, horizontally, passing between said jaws, the improvement comprising a constraint chute below said jaws, said constraint chute comprising two vertical walls which are adapted to permit a material-filled pouch to travel therebetween, said pouch being formed by transversely heat sealing a material-filled tubular film at intervals, using said jaws to form said seals, one of said walls being adapted to move away from the other wall under tension and to return to its original position, the degree of tension and the friction of said walls being sufficient to squeeze said pouch therebetween and to permit said pouch to travel therebetween without undue restraint, the plane of both of said walls being perpendicular to the direction of closing of said jaws; wherein there is (a) a pair of spreader fingers adapted to be inside said tubular film and to shape the tubular film towards a layflat configuration, such layflat configuration having longitudinal edges, thus spreading the longitudinal edges of said tubular film outwardly above said jaws, and (b) at least one pair of detucker fingers which are adapted to act in unison with the transverse motion of the heat sealing jaws, located close to the heat sealing jaws and wherein each pair of detucker fingers is adapted (i) to pinch a longitudinal edge of said tubular film such that when the tubular film has been pinched by the detucker fingers, the detucker fingers are close to such longitudinal edge of said tubular film, and (ii) to urge said pinched tubular film transversely in a direction substantially parallel to the closing surfaced of said jaws and away from the other longitudinal edge of said tubular film.

8. A vertical form, fill and seal machine according to claim 7 wherein each wall consists of a multiplicity of rollers.

9. A vertical form, fill and seal machine according to claim 7 wherein the tension is provided by tension springs.

10. A vertical form, fill and seal machine according to claim 7, 11 or 12 wherein the movable wall has tension springs associated therewith at top and bottom of the wall and there is greater tension on the springs at the bottom than on the springs at the top.

11. A vertical form, fill and seal machine according to claim 7 wherein the detucker fingers are attached to the jaws.

12. A vertical form, fill and seal machine according to claim 7 wherein one of said spreader fingers is fixed and the other is adapted to float, the free ends of said spreader fingers being located close to and above said jaws.

13. A vertical form, fill and seal machine according to claim 7 wherein there is one pair of detucker fingers, and one of said spreader fingers is fixed and the other is adapted to float, the free ends of said spreader fingers being located close to and above said jaws, said pair of detucker fingers being adapted to urge the opposing longitudinal edge of said tubular film away from said fixed spreader finger.

14. A vertical form, fill and seal machine according to claim 7 wherein there are two pairs of detucker fingers, one pair being adapted to pinch and urge one longitudinal edge of said tubular film and the other pair being adapted to pinch and urge th eother longitudinal edge of said tubular film, each pair being adapted to urge in opposing directions, said vertical form, fill and seal machine having two floating spreader fingers.

15. In a vertical form, fill and seal machine which has a pair of transverse heat sealing jaws with at least one of said jaws being capable of transverse motion and adapted to collapse a tubular film, horizontally, passing between said jaws, the improvement comprising a constraint chute below said jaws, said constraint chute comprising two vertical walls which are adapted to permit a material-filled pouch to travel therebetween, said pouch being formed by transversely heat sealing a material-filled tubular film at intervals, using said jaws to form said seals, one of said walls being adapted to move away from the other wall under tension and to return to its original position, the degree of tension and the friction of said walls being sufficient to squeeze said pouch therebetween and to permit said pouch to travel therebetween without undue restraint, the plane of both of said walls being perpendicular to the direction of closing of said jaws, wherein there are two pairs of detucker fingers, one pair being adapted to pinch and urge one longitudinal edge of said tubular film and the other pair being adapted to pinch and urge the other longitudinal edge of said tubular film, each pair being adapted to urge in opposing directions, said vertical form, fill and seal machine being devoid of spreader fingers.

16. A vertical form, fill and seal machine according to claim 6, 13, 14 or 15 wherein the detucker fingers are below the jaws.

17. A vertical form, fill and seal machine according to claim 6, 13, 14 or 15 wherein each detucker finger is a springy metal leaf, one end of which is attached to a reciprocating drive apparatus, and the other end of which is curved to form, with a matching detucker finger, a gripping, non-poking surface for said film, the springiness of said leaf being selected such that said film, when gripped and urged is firmly gripped without damaging said film.

18. A vertical form, fill and seal machine according to claim 17 wherein the curved end of the metal leaf is coated with polyurethane of high coefficient of friction.

19. A vertical form, fill and seal machine according to claim 6, 13, 14 or 15 wherein each detucker finger is made from a flexible synthetic thermoplastic polymer of high coefficient of friction, arcuately shaped, and mounted such that the convex surfaces of the fingers are adjacent one another when the film is gripped.

20. A vertical form, fill and seal machine according to claim 19 wherein the synthetic thermoplastic is a polyurethane.

21. A vertical form, fill and seal machine according to claim 7, 13, 14 or 15 wherein there is a chute above the jaws, said chute being adapted to squeeze said material-filled tubular film and to funnel the squeezed material-filled tubular film between said jaws.

22. A process for packaging a flowable material on a vertical form, fill and seal machine which has a pair of transverse heat sealing jaws with at least one of said jaws being capable of transverse motion, and a pair of spreader fingers, one of which is fixed, said spreader fingers being adapted to shape a tubular film towards a layflat configuration having longitudinal edges, thus being adapted to spread the longitudinal edges outwardly above said jaws, said process comprising the steps of:
(i) forming a continuous tube of a synthetic thermoplastic polymeric film and filling said tube with said flowable material;
(ii) causing said tube to travel between two jaws of a heat sealing device;
(iii) causing at least one of said jaws to travel towards the other jaw to collapse a transverse cross-section of the tube;
(iv) just before the jaws close to fully collapse the tube, causing a pair of detucker fingers which are located close to the heat sealing jaws, and are located at an end of said jaws opposite to the end of said jaws adjacent to said fixed spreader finger, to travel in a plane and direction parallel to the plane and direction of travel of said jaws and in unison with said jaws such that the fingers pinch the tubular film close to a longitudinal edge fold of said collapsing tube, and urge said pinched tube in a transverse direction substantially perpendicular to the direction of travel of said jaws and away from the fixed spreader finger;
(v) transversely heat sealing the collapsed portion of the tube to make an airtight seal across the tube;
(vi) repeating steps (ii) to (v) to form a pouch filled with said flowable material; and
(vii) severing adjacent pouches from one another.

23. A process according to claim 22 wherein the transverse heat sealing and severing is accomplished in the same step.

24. A process according to claim 22 wherein the step of severing of the pouches from one another is accomplished separately from the heat sealing step.

25. A process according to claim 22 wherein the fixed spreader finger is located close to and above said jaws and is inside said tubular film.

26. A process according to claim 22 wherein there is a second pair of detucker fingers located close to the sealing jaws at an end adjacent to said fixed spreader finger, which second pair of detucker fingers cooperates with the other pair of detucker fingers in the further steps of: pinching the other longitudinal edge of the tubular film and urging said pinched tube in a transverse direction substantially perpendicular to the direction of travel of said jaws and away from the other longitudinal edge of the tubular film.

27. A process for packaging a flowable material on a vertical form, fill and seal machine which has a pair of transverse heat sealing jaws with at least one of said jaws being capable of transverse motion and additionally has a constraint chute below said jaws, said constraint chute comprising two vertical walls which permit a material-filled pouch to travel therebetween, one of said walls being adapted to move away from the other wall under tension and to return to its original position, the degree of tension and the friction of said walls being sufficient to squeeze said pouch therebetween and to permit said pouch to travel therebetween without undue restraint, the plane of one of said walls being perpendicular to the direction of closing of said jaws, said process comprising the steps of:

(i) forming a continuous tube of a synthetic thermoplastic polymeric film and filling said tube with said flowable material;

(ii) causing said tube to travel between two jaws of a heat sealing device;

(iii) causing at least one of said jaws to travel towards the other jaw to collapse a transverse cross-section of the tube, said tube then having the two longitudinal edges at the line of closure of said jaws;

(iv) transversely heat sealing the collapsed portion of the tube to make an airtight seal across the tube;

(v) repeating steps (ii) to (iv) to form a pouch filled with said flowable material; and (vi) severing adjacent pouches from one another;

wherein between steps (ii) and (iv) causing two pairs of detucker fingers, which are located close to the heat sealing jaws, to travel in a plane and direction parallel to the plane and direction of travel of said jaws and in unison with such jaws such that the detucker fingers pinch the tubular film close to the edges of the collapsing tube and such that one pair of detucker fingers pinches and urges a longitudinal edge of said tubular film and the other pair of detucker fingers pinches and urges the other longitudinal edge of said tubular film, each pair being adapted to urge in opposing directions, said vertical form, fill and seal machine being devoid of spreader fingers.

28. A process for packaging a flowable material on a vertical form, fill and seal machine which has a pair of transverse heat sealing jaws with at least one of said jaws being capable of transverse motion and additionally has a constraint chute below said jaws, said constraint chute comprising two vertical walls which permit a material-filled pouch to travel therebetween, one of said walls being adapted to move away from the other wall under tension and to return to its original position, the degree of tension and the friction of said walls being sufficient to squeeze said pouch therebetween and to permit said pouch to travel therebetween without undue restraint, the plane of one of said walls being perpendicular to the direction of closing of said jaws, said process comprising the steps of:

(i) forming a continuous tube of a synthetic thermoplastic polymeric film and filling said tube with said flowable material;

(ii) causing said tube to travel between two jaws of a heat sealing device;

(iii) causing at least one of said jaws to travel towards the other jaw to collapse a transverse cross-section of the tube, said tube then having the two longitudinal edges at the line of closure of said jaws;

(iv) transversely heat sealing the collapsed portion of the tube to make an airtight seal across the tube;

(v) repeating steps (ii) to (iv) to form a pouch filled with said flowable material; and (vi) severing adjacent pouches from one another;

wherein said form, fill and seal machine has at least one pair of detucker fingers, which are located close to the heat sealing jaws, and just before the jaws fully collapse the tube, each pair of detucker fingers are caused (i) to pinch a longitudinal edge of said tubular film such that when the tubular film has been pinched by the detucker fingers, the detucker fingers are close to such longitudinal edge of said tubular film, and (ii) to urge said pinched tubular film transversely in a direction substantially parallel to the closing surfaces of said jaws and away from the other longitudinal edge of said tubular film.

29. A process according to claim 28 wherein the detucker fingers are caused to operate by.

30. A process according to claim 28 wherein the detucker fingers are below the jaws.

31. A process for packaging a flowable material on a vertical form, fill and seal machine which has a pair of transverse heat sealing jaws with at least one of said jaws being capable of transverse motion and additionally has a constraint chute below said jaws, said constraint chute comprising two vertical walls which permit a material-filled pouch to travel therebetween, one of said walls being adapted to move away from the other wall under tension and to return to its original position, the degree of tension and the friction of said walls being sufficient to squeeze said pouch therebetween and to permit said pouch to travel therebetween without undue restraint, the plane of one of said walls being perpendicular to the direction of closing of said jaws, said process comprising the steps of:

(i) forming a continuous tube of a synthetic thermoplastic polymeric film and filling said tube with said flowable material;

(ii) causing said tube to travel between two jaws of a heat sealing device;

(iii) causing at least one of said jaws to travel towards the other jaw to collapse a transverse cross-section of the tube, said tube then having the two longitudinal edges at the line of closure of said jaws;

(iv) transversely heat sealing the collapsed portion of the tube to make an airtight seal across the tube;

(v) repeating steps (ii) to (iv) to form a pouch filled with said flowable material; and (vi) severing adjacent pouches from one another;

wherein between steps (i) and (ii) there are a pair of spreader fingers inside the tubular film which shapes the tubular film towards a layflat configuration having longitudinal edges, thus spreading the tubular film outwardly above said jaws, and wherein one of the spreader finger is fixed and the other is allowed to float.

32. A process according to claim 31 wherein the free ends of said spreader fingers are located close to and above said jaws, and wherein one pair of detucker fingers is located close to the sealing jaws and at an end of said jaws opposite to the end of said jaws adjacent to said fixed spreader finger, comprising the further step of: causing the detucker fingers, just before the jaws fully collapse the tube, to travel in a plane and direction parallel to the plane and direction of travel of said jaws and in unison with said jaws, thereby pinching the tubular film close to the longitudinal edge of said collapsing tube and urging said pinched tube in a transverse direction substantially perpendicular to the direction of travel of said jaws and away from the fixed spreader finger.

33. A process according to claim 27, 28 or 32 wherein each detucker finger is a springy metal leaf, one end of which is attached to a reciprocating drive apparatus, and the other end of which is curved to form a gripping, non-poking surface for said film, the springiness of said leaf being selected such that said film, when gripped and urged so firmly gripped without damaging said film.

34. A process according to claim 33 wherein the curved end of the metal leaf is coated with polyurethane of high coefficient of friction.

35. A process according to claim 27, 28, or 32 wherein the machine further comprises a chute above said jaws, further comprising the steps of: guiding the tubular film toward said jaws by means of said upper chute and shaping the material-filled tubular film into a substantially oblong cross-section by means of said upper chute.

36. A process according to claim 27, 28 or 32 wherein the detucker fingers are attached to the undersides of said jaws.

37. A process according to claim 27, 28 or 32 wherein each detucker finger is made from a flexible synthetic thermoplastic polymer of high coefficient of friction, arcuately shaped, and mounted such that the convex surfaces of the fingers are adjacent one another when the film is gripped.

38. A process according to claim 44 wherein the synthetic thermoplastic is a polyurethane.

* * * * *